Aug. 7, 1962     L. BEAUJARD ETAL     3,048,031
DEVICE FOR AUTOMATICALLY CORRECTING THE VARIABLES IN
THE ULTRASONIC TESTING OF MATERIALS
Filed Feb. 14, 1957     3 Sheets-Sheet 1

INVENTORS
LOUIS BEAUJARD
CHARLES R. MAEDER
JACQUES A. PINARD
BY [signature]
AGENT

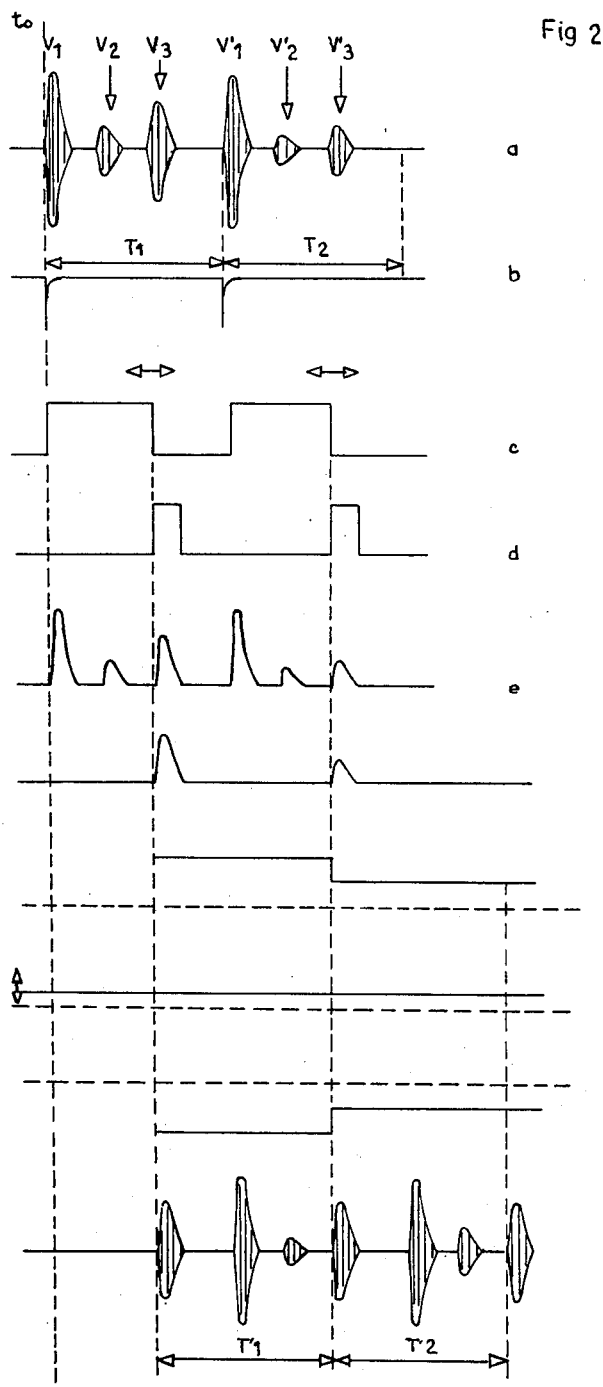

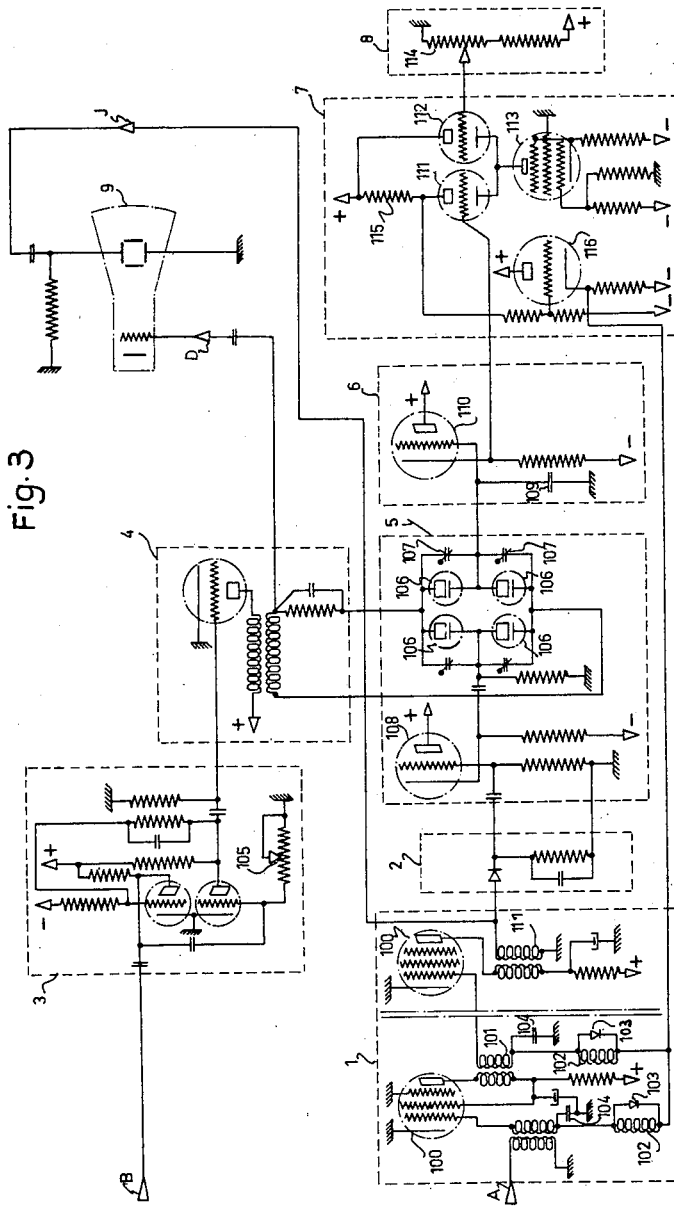

United States Patent Office 3,048,031
Patented Aug. 7, 1962

3,048,031
DEVICE FOR AUTOMATICALLY CORRECTING THE VARIABLES IN THE ULTRASONIC TESTING OF MATERIALS
Louis Beaujard, Saint Germain-en-Laye, Charles René Maeder, Paris, and Jacques André Pinard, Saint Germain-en-Laye, France, assignors to Institut de Recherches de la Siderurgie, Saint Germain-en-Laye, France, a professional institution of France
Filed Feb. 14, 1957, Ser. No. 640,140
Claims priority, application France Feb. 17, 1956
8 Claims. (Cl. 73—67.8)

It is known that the testing by ultrasonic echoes of materials permeable to ultrasonic radiation is performed in the manner described below.

A pilot system, for example, a pulse oscillator of the type disclosed in U.S. Patent No. 2,280,226, produces timing pulses for triggering a generator system which supplies brief and powerful pulses of a peak amplitude of the order of, for instance, E volts.

The said pulses, applied to a piezoelectric element suitably damped by electrical or mechanical means, for instance, a crystal of quartz or barium titanate, cause the element to perform mechanical vibrations. The said piezoelectric element or transducer, when applied to the surface of the article or workpiece to be examined, imparts to the latter short mechanical vibrations through the intermediary of a suitable coupling medium. Such mechanical vibrations are reflected by a discontinuity, for instance, a flaw, or by the opposite surface of the piece. They return to the transducer in which they are transformed into electrical oscillations, which are amplified and applied to the vertical deflection plates of a cathode ray oscilloscope, the horizontal plates whereof receive an electric saw-tooth voltage, controlled by the pulses of the aforesaid pilot generator; resulting in a horizontal, linear displacement of the light spot according to a time base. Since the emitted pulse likewise acts on the vertical deflection plates, the oscillogram obtained from the examination of a work piece will commence with a vertical deflection; the following vertical deflections will mark the echoes of the flaw or flaws. In a general sense, the echo given by the opposite surface of the piece, i.e. the background echo, is considerable, and is located at the end of the oscillogram. If the horizontal sweep of the oscilloscope is slow, it may happen that mechanical pulses will be recorded, after passing to and fro between the surface on which the piezoelectric element is placed, and the opposite surface.

This oscillogram with "multiple echoes" can usefully be employed in the examination of thin pieces, such as sheets or foils. In actual fact, the ultrasonic echo becomes attenuated in the measure that the mechanical pulses travel a greater distance through the body of the piece. The envelope of the successive background echoes, obtained by joining together the peaks of the echoes, is approximately an exponentially-fading curve. If a flaw, for instance, a crack, is present in line with the transducer, the emitted ultrasonic energy will be in high degree absorbed by such flaw and the envelope curve of the aforementioned series of background echoes will fade exponentially, far more abruptly than if the material is sound.

The height of the background echo observed on the screen can be expressed in terms of the different influencing parameters of the instrument, on the asumption that the faces of the article examined are plane-parallel, and the ultrasonic beam is cylindrical.

Putting E as the peak amplitude in volts, of the emitted electrical pulses, then $a$ can represent the coefficient of the transformation ratio between electrical and mechanical energy in the transducer; $a$ will depend, among other things, on the mechanical and electrical damping found necessary for the correct functioning of the piezoelectric transducer. The mechanical energy furnished by this element is, consequently, represented by $Ea$.

Putting as $b$ the coefficient of transmission of mechanical energy from the transducer to the workpiece, $b$ will depend on the coupling medium between the transducer and the piece, the surface roughness of the latter, the presence of an absorbent layer (e.g. scale), the acoustic impedance of the material, etc. The mechanical energy conveyed to the work piece is, consequently, equal to $Eab$.

Putting $c$ as representing the coefficient of reflexion of the opposite face or background of the piece, which has a value of very nearly unity, the energy reflected by that surface will be expressed by $Eabc$.

If $d$ is the coefficient of attenuation of the mechanical energy in the double thickness of the material traversed by the ultrasonic waves, the energy reflected from the background to the transducer will be equal to $Eabcd$.

If, again, $e$ represents the coefficient of transmission of the supersonic vibrations between the piece and the transducer, influenced by the same factors as the coefficient $b$, the mechanical energy received by the transducer will be represented by $Eabcde$.

Putting $f$ as the coefficient of the transformation ratio of mechanical to electric energy in the piezoelectric element, which coefficient is analogous to the coefficient $a$, the electrical tension or voltage developed in the transducer is represented by $Eabcdef$.

Finally, putting G as the amplifier gain, in combination with the deflection characteristics of the cathode ray oscilloscope, the height F of the background echo on the oscilloscope screen will be ultimately represented by the expression:

$$F = E.abcdef.G$$

Similarly, the echo of a flaw will be represented by:

$$D = E.abc'def.G$$

where $c'$ is the coefficient of reflexion of the defect, depending on its extent, nature and orientation.

All the above coefficients or parameters can be classified in three groups:

(1) Those which are in fact to be measured: e.g. $c$ and $c'$;

(2) Those varying accidentally during testing, impeding the same, i.e. $b$ (transmission between transducer and work piece), $d$ (attenuation in the material), $e$ (transmission between work piece and transducer). These can be assembled under one factor: $K = bde$.

(3) Those remaining practically constant and which can be influenced, such as E. $af$. G.

F and D can now be expressed in the form:

$$F = c.E.af.G.K.$$
$$D = c'.E.af.G.K.$$

If it is required to eliminate the influence of irregular contact and acoustic permeability (factor K), or of the slow change of $E.af.G$, two means are possible.

One may calculate the ratio of the echo intensity of the flaw to the echo intensity of the background:

$$\frac{D = c'}{F = c}$$

in which accidentally varying factors, the variation whereof impairs the accuracy of the information, have been eliminated, excepting $c'$ and $c$. This is a long and troublesome calculation requiring high precision of the measurements, and assumes that the amplifier gain is linear. It is inapplicable to continuous, automatic, inspection methods, and in the case of very weak echoes from very small flaws in which the ratio $D:F$ is low.

It is also possible to influence E.af.G in the manner that:

$$c.E.af.G.K. = \text{Const.} = F$$

This equation shows that if K or c is varied, F can be maintained constant by influencing E, or the level of emission; a and f, representing the damping in the piezo-electric element; or G, the gain.

Control of these parameters, in practice is made by manually adjusting the instrument. Then the continuity of scanning is interrupted when these adjustments have to be made. Such adjustments are on the other hand impossible in the case of a continuous, automatic inspection.

The main object of the present invention is to provide a device not having the aforementioned disadvantages and enabling automatic and rapid control of an instrument for testing by ultrasonic echoes with a view to the variations of all kinds which may take place during the testing process and in particular such changes as may take place in the conditions of transmission between the scanning unit and the test piece.

The invention thus solves the problem of the continuous regulation of the indications given by the process of examination by ultrasonic echoes in cases in which surface or structural irregularities in the test material influence the energy of the supersonic beam and modify the aspect of the oscillogram in such manner as to lead an observer to erroneous conclusions or oblige him to correct by hand, the adjustments of the instrument in order to restore comparable conditions of examination; or, furthermore, oblige him to measure the height or intensity of the flaw echo and background echo and calculate the ratio between the same.

The invention further solves the problem of a continuous and automatic exploration by ultrasonic echoes in which the perturbing causes mentioned above could falsify the indications given by the instrument without it being possible to correct them by manual adjustments, in consideration of the great rapidity of the scanning process, i.e. the great speed at which the test piece passes under the transducer.

Other features and advantages of the invention will become apparent from the following description of an embodiment diagrammatically shown in the attached drawings, in which:

FIG. 2 shows the form of the electric signals taking place in different parts of the apparatus; and FIG. 3 is a detailed diagram of the electrical circuits comprised in the apparatus.

Figure 1:
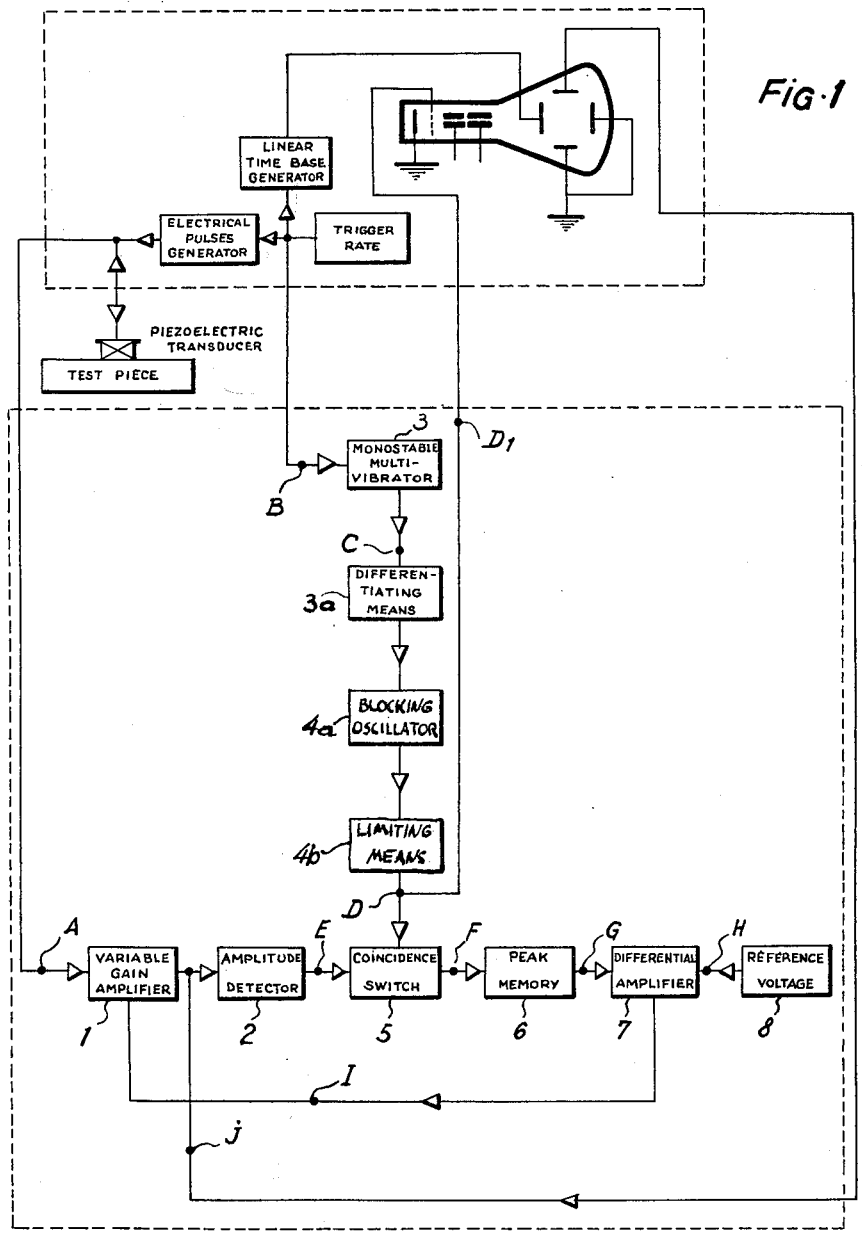
FIG. 1 is an electric block diagram of the apparatus.

The electric signals applied to the input terminal A of FIG. 1 are furnished by a conventional ultrasonic testing apparatus such as a piezoelectric transducer.

The electric signals given by the ultrasonic testing apparatus are of the form represented by curve a in FIG. 2. Two consecutive periods T.1 and T.2 are shown therein. V.1 is the peak value of the emitted electric pulse, V.2 the peak value of the pulse reflected by a flaw, V.3 the peak value of the pulse reflected by the background of the test material. During the second period T.2, it is assumed that the factor K, previously defined, has experienced a change with a concomitant variation in the amplitude of the input signal; V.1 remains constant, V.2 becomes V'2 and V.3 becomes V'3. V'1 represents the peak value of the emitted pulse during the period T.2. The purpose of the arrangement according to the invention is to maintain V.3 constant, whatever the values assigned to the factor K, and consequently, the values assumed by V.2, for a particular flaw.

In FIG. 1, the controlled gain amplifier is shown at 1. This amplifier has two input terminals and one output terminal. The first input terminal, shown at A, receives the input voltages given by the piezoelectric transducer of the conventional ultrasonic testing apparatus. The amplifier is equipped with remote cut-off pentode valves and is assembled of a number of stages. Interstage coupling is effected by high frequency transformers. This method of coupling has been chosen by reason of the high gain per stage which it provides, and likewise on account of the quick recovery after excitation by high-voltage pulses, such as V.1. The high frequency transformers are selectable by a switch to enable tuning to the working frequency of the piezoelectric transducer. The voltage controlling the gain of the amplifier 1 is obtained at the point I in FIG. 1, which is the second input terminal of the amplifier, and is of the form represented by the curve i in FIG. 2, in which the dotted line indicates the earth potential level.

The output of the amplifier 1 is connected to an amplitude detector 2 which has the purpose of revealing the envelope curve of the pulses by eliminating the high frequency wave. The time constant of the circuits of the amplitude detector 2 is chosen at a low value, e.g. 10 microsecs, in order not to modify the form of the envelope curve of the pulses, as shown at e in the chart (FIG. 2). The terminal marked B in FIG. 1 receives from the ultrasonic testing apparatus electrical synchronizing signals defining the start of each cycle, as represented by curve b (FIG. 2). These enable the monostable multivibrator 3, acting as a variable timing device, the signal duration whereof is adjustable, e.g. between 3 microsecs and 1000 microsecs, to the actuated at the correct instant t. The signal emitted by the monostable multivibrator 3 and obtained at the point c has the form represented by curve c (FIG. 2). The rear, movable edge of the signal furnished by the monostable multivibrator 3 can, for instance, be adjusted manually to coincide exactly with the front face of the pulse corresponding to the background echo V, the amplitude whereof is to be maintained independent of any possible variations of the factor K. The element 3a in FIG. 1 represents a conventional electric differentiating device which permits the electric differentiation of curve c. The element 4 in FIG. 1, represents the unblocking signal generator, acting as a timing device, actuated by the differentiated rear edge of the signal represented by the curve c. This circuit 4 is formed of a blocking oscillator 4a in conjunction with an amplitude limited 4b, and enables an electric signal to be received at the point D, of the form represented by the curve d (FIG. 2). The width of this signal may be the same as, or slightly more than, the width of the pulse, e.g. V.3, which it is proposed to time select. The unblocking signal obtained at the point D is directed on the one hand to the coincidence switch 5, and on the other hand, at D.1, to the control grid of the indicating cathode ray tube of the ultrasonic testing apparatus. This arrangement enables the light spot on the cathode ray tube screen to be intensified throughout the whole period of the unblocking pulse; the time selected echo appearing more brilliant on a trace of less luminosity. This arrangement permits to know exactly the position of the selected background echo.

The coincidence switch 5 receives at its input terminal E an electric signal as represented by the curve e (FIG. 2) and has the purpose of preventing its output circuit from receiving anything but the electric pulse, e.g. V.3, the amplitude whereof is a function of the value assumed by the factor K. The coincidence switch 5 may be constituted by a diode switch, the internal capacitances of which are balanced by variable condensers. The signal e (FIG. 2) is fed to the input of the coincidence switch which has a low-impedance source, e.g. a cathode follower. The output of the coincidence switch 5 is loaded by a memory circuit, represented at 6 in FIG. 1, incorporating a high quality condenser associated with an impedance matching stage, the input circuit whereof is arranged to prevent any leak during the blocking period. e.g. 1000 times the duration of the unblocking impulse; while the output circuit has the lowest impedance compatible with very rapid response. The output circuit of 6 exhibits an electric signal as represented by the curve g (FIG. 2), in which the dotted line represents the earth potenital. During the period T'1, in the example shown, the signal maintains a constant value corresponding to the peak value V.3 of the pulse time selected. During the second period T'2, the factor K having experienced a variation, the pulse corresponding to the background echo has become attenuated, and has assumed a new peak value corresponding to V'3. According to the chosen example in which V'3 is lower than V.3., the memory condenser discharges and adds to the value of V'3 during the unblocking period of the combining switch, through the low resistance loading the input circuit thereof and maintains the peak value of V'3 during the entire period T'2. If V'3 were higher than V.3, the condenser would be charged by the incoming signal through the four-diode switch 5 (FIGS. 1 and 3).

The general form of the signal g (FIG. 2) is thus that of a strictly D.-C. voltage throughout the duration of a period and which may abruptly increase or decrease at the start of each cycle, depending on the value assumed by the factor K; the horizontal dotted line in the figure, representing the earth potential.

A differential amplifier with two input terminals and one output terminal is represented at 7 in FIG. 1. This amplifier includes two triode systems in the same bulb. The cathodes are joined and loaded by a pentode, returning to negative potential; this constant current arrangement provides a high cathode resistance without attenuating the current.

The signal shown at the point G, of the form represented by the curve g (FIG. 2), is applied to the control grid of the first triode. The control grid of the second triode receives a D.-C. voltage manually adjustable at will from the element 8 (FIG. 1), constituted by a reference voltage. This D.-C. tension is represented at h in FIG. 2, the horizontal dotted line representing the earth potential. The anode of the first triode is loaded by a resistance and the electric signal received therein is the amplified, inverted difference of the signals present respectively at the points G and H of FIG. 1; this represents the controlling voltage of the form represented by the curve i. This signal is conducted by a low-impedance line, e.g. a cathode follower stage, to the control grid terminals of each stage in the controlled gain amplifier 1 of FIG. 1. Between the common distributing main and each point at which the control signal is applied in the stages of amplifier 1, a device is interposed, consisting of a choke coil coupled with a germanium rectifier and a bypass condenser of low capacitance at the working frequencies. The combination of these three elements enables simultaneous application to the control grid of each of the controlled stages in the amplifier 1, of the high frequency signal and the control pulse, without any feedback from the one to the other. The choke coil having on the one hand a very high impedance in the high frequency band, this latter does not influence the common feeder of the control signals; having, on the other hand, only a low resistance to the quasi-direct current of the control pulse, the later is applied without distortion and instantaneously to the input terminals of each stage of the amplifier 1. The germanium rectifier enables the choke coil to be damped for pulses of large amplitude, several hundred volts, produced by the emitted pulses V.1, represented by the curve a (FIG. 2). The germanium rectifier is connected in such sense that the applied pulse sets up a negative tension tending to block the amplifier during the period of an emitted pulse V.1 and gives the amplifier 1 a very high insensitivity to overloads.

The signal represented by the curve i (FIG. 2) forms the electronic output signal which is applied to the vertical deflection plates of the indicating cathode ray tube, while the horizontal deflection plates thereof are fed by the capacitive saw tooth generator which is actuated by the synchronizing pulse shown on curve b (FIG. 2).

The detailed circuit is shown in FIG. 3. According to this diagram, the controlled gain amplifier 1 incorporates a plurality of pentode valves 100, two of which are represented in the figure, coupled by a high frequency transformer 101 and associated with choke coils 102 and germanium rectifiers 103; the by-pass condensers are shown at 104.

The monostable multivibrator 3 is fed by the synchronizing pulses furnished by the trigger rate generator. The duration of the metastable period can be adjusted by the potentiometer shown at 105. The signal emitted by the multivibrator is fed to the grid of valve of the blocking oscillator 4.

The signal generated in this blocking oscillator is applied for the one part to the input of the coincidence switch 5, and for the other part to the control grid of an indicating cathode ray tube 9, forming part of the ultrasonic unit. The coincidence switch 5 contains four thermionic diodes 106 the internal capacitances whereof are balanced by the movable condensers 107. The input of the coincidence switch incorporates a cathode follower stage consisting of a triode 108, while the output terminal of the said switch is loaded by a memory circuit 6. This memory circuit 6 is formed by a condenser 109 associated with a triode 110. The control voltage coming from the memory circuit 6 is applied to the control grid of the triode 111, forming part of the differential amplifier 7, which has two triodes. The cathodes of the valves 111 and 112 are connected together and charged by a pentode 113 returning to a negative potential. The voltage of the reference source 8 is applied to the control grid of the triode 112 and can be manually adjusted at will by means of the potentiometer 114. The anode of the triode 111 is charged through the intermediary of a resistance 115. The signal received at this anode is directed by a low-impedance line including a triode 116, to the control grids of the pentode valves 100 included in the controlled gain amplifier 1.

Finally, the output voltage of the last transformer 117 in the amplifier 1 is applied to the vertical deflection plates of the oscilloscope 9.

It is to be understood that the forms of the invention herewith shown and described are to be taken as preferred examples of the same and that various changes in the shape, size and arrangement of parts may be resorted to without departing from the spirit of the invention or the scope of the subjoined claims.

What we claim is:

1. An apparatus for automatically correcting variable conditions during testing of a test piece by ultrasonic echoes, comprising means for generating electrical pulses, a timing device for triggering said generating means, electro-mechanical transducer means connected to said generating means for transmitting ultrasonic pulses into the test piece and receiving echoes thereof including background echoes of the test piece and the echoes from the defects thereof, and converting said echoes into input voltages, timing means connected to said timing device and transducer for time selecting said background echo voltage, and electronic means connected to said timing means for producing a memory voltage which instantaneously reaches and remains equal to the peak voltage produced by a background echo during the interval between two successive background echo pulses, an adjustable electric source for producing a reference voltage, means connected to said source and memory voltage producing means for comparing said memory voltage with said reference voltage for obtaining a resultant error voltage corresponding to the difference between said voltages, and means, connected to said comparing means and said transducer for varying the magnitude of the voltages derived from said transducer in accordance with said error voltage for maintaining said memory voltage at a substantially constant value and for producing output voltages varying in magnitude according to said error voltage.

2. An ultrasonic apparatus for testing material, comprising an electrical pulse generator, a triggering generator connected to the pulse generator, an electro-mechanical transducer connected to the pulse generator, a cathode ray tube oscilloscope, a variable gain amplifier with two input terminals and one output terminal, one of said input terminals being connected to the transducer for receiving input voltage corresponding to the background echo and to the echoes of the defects of a workpiece under test, detecting means connected to the output terminal of said variable gain amplifier; a coincidence switch for receiving from said detecting means amplified and rectified voltages corresponding to the echoes, a timing device for gating the coincidence switch, a variable timing device connected between said triggering generator and said timing device for triggering said timing device, a memory circuit connected to the detecting means through the coincidence switch, a source producing a reference voltage, a differential amplifier with two input terminals, one connected to said memory circuit, the other receiving said reference voltage, the differential amplifier having an output connected to the other input terminal of the amplifier for controlling the gain of the variable gain amplifier; the cathode ray tube having vertical deflection plates connected to the output terminal of said variable gain amplifier and a control grid connected to the output of said timing device for intensifying the light spot of the cathode ray tube.

3. Apparatus for ultrasonic testing of a material comprising a source of electrical pulses having a given period, a triggering generator connected to said source, an ultrasonic transducer connected to said source, a variable gain amplifier having a first input circuit connected to said transducer for receiving input voltages corresponding to echoes from a back surface of said material and from a defect therein, a second input circuit for receiving a gain control voltage and an output circuit, detecting means connected to said output circuit of the variable gain amplifier for detecting the envelope of said input voltages being amplified, coincidence circuit means connected to said detecting means for producing an output pulse having an amplitude corresponding to the amplitude of the back surface echo, adjustable timing means responsive to said triggering generator for gating said coincidence circuit means whereby only the back echoes are selected, a peak voltage memory circuit connected to the output of said coincidence circuit means for producing a voltage proportional to the amplitude of the last received back surface echo and having a constant value till the next back surface echo, a reference direct voltage source, comparison means for producing a control voltage corresponding to the difference between the output voltage of the memory circuit and the reference voltage, said second input circuit of the variable gain amplifier being connected to said comparison means for receiving said control voltage for maintaining the gain of said amplifier constant throughout each period between two successive back surface echoes at a level determined by the amplitude of only the back surface echo at the beginning of that period and indicating means connected to the output of said amplifier.

4. Apparatus according to claim 3, wherein said variable gain amplifier is constructed to permit changing of its gain to a new value in response to the comparison means without appreciable delay.

5. Apparatus according to claim 4, wherein said second input circuit of the variable gain amplifier includes a parallel connected choke coil and rectifier connecting said second input circuit to said comparison means.

6. Apparatus according to claim 3, wherein said comparison means includes a relatively low impedance output circuits for delivering said control voltage to said second input circuit.

7. Apparatus according to claim 6, wherein said comparison means is a differential amplifier having one input electrode connected to said memory circuit and another input electrode connected to the reference voltage source, said low impedance output circuit including a cathode follower, and an output connection from the differential amplifier to a control electrode of said cathode follower.

8. Apparatus according to claim 3, wherein said coincidence circuit means includes a first pair of series connected diodes and a second pair of series connected diodes connected in parallel with the first pair, said detecting means being connected to the junction between the diodes of one of said pairs and said memory circuit being connected to the junction of the other pair of diodes, said adjustable timing means being connected across said pairs of diodes.

References Cited in the file of this patent

UNITED STATES PATENTS

| | | |
|---|---|---|
| 2,280,226 | Firestone | Apr. 21, 1942 |
| 2,534,006 | DeLano, et al. | Dec. 12, 1950 |
| 2,799,787 | Guttner et al. | July 16, 1957 |
| 2,803,129 | Bradfield | Aug. 20, 1957 |

FOREIGN PATENTS

| | | |
|---|---|---|
| 92,396 | Norway | Sept. 1, 1958 |